(12) United States Patent
Wu et al.

(10) Patent No.: US 10,328,591 B2
(45) Date of Patent: Jun. 25, 2019

(54) APPARATUS AND METHOD FOR SEPARATING TOUCH SCREEN AND DISPLAY SCREEN

(71) Applicants: BOE TECHNOLOGY GROUP CO., LTD., Beijing (CN); HEFEI BOE OPTEOELECTRONICS TECHNOLOGY CO., LTD., Hefei, Anhui (CN)

(72) Inventors: Wenming Wu, Beijing (CN); Fangfang Wu, Beijing (CN); Lin Lin, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 112 days.

(21) Appl. No.: 14/426,466

(22) PCT Filed: May 23, 2014

(86) PCT No.: PCT/CN2014/078294
§ 371 (c)(1),
(2) Date: Mar. 6, 2015

(87) PCT Pub. No.: WO2015/096373
PCT Pub. Date: Jul. 2, 2015

(65) Prior Publication Data
US 2016/0031106 A1  Feb. 4, 2016

(30) Foreign Application Priority Data
Dec. 23, 2013 (CN) .......................... 2013 1 0721938

(51) Int. Cl.
*B26D 1/547* (2006.01)
*B26D 3/28* (2006.01)
(Continued)

(52) U.S. Cl.
CPC ............... *B26D 1/547* (2013.01); *B26D 3/28* (2013.01); *G02F 1/1303* (2013.01);
(Continued)

(58) Field of Classification Search
CPC ............... Y10T 83/041; Y10T 83/0433; Y10T 83/0453; Y10T 83/2072; Y10T 83/2074;
(Continued)

(56) References Cited

U.S. PATENT DOCUMENTS 2,711,020 A * 6/1955 Hastings ................ B26D 1/547
144/114.1
4,111,085 A * 9/1978 Johnson ................ B23D 53/04
83/801
(Continued)

FOREIGN PATENT DOCUMENTS

CN  102236199 A  11/2011
CN  103696282 A  3/2014
(Continued)

OTHER PUBLICATIONS

English translation of third Chinese Office Action dated Oct. 23, 2015, for corresponding Chinese Patent Application No. 201310721938.8.
(Continued)

*Primary Examiner* — Phong H Nguyen
(74) *Attorney, Agent, or Firm* — Kinney & Lange, P.A.

(57) ABSTRACT

Disclosed are an apparatus and a method for separating a touch screen and a display screen, the apparatus comprises: a working base station configured to hold the touch screen and the display screen jointed together by a sealant; a heater
(Continued)

mounted inside of the working base station and configured to heat and soften the sealant between the touch screen and the display screen; a saw wire arranged to contact a contact boundary between the touch screen and the display screen and to reciprocate at least in a tangent direction of the contact boundary so as to preliminarily separate the touch screen and the display screen; a first adsorption device configured to adsorb the display screen and remove the display screen from the touch screen; and a mutual moving mechanism configured to enable the saw wire to contact the contact boundary between the touch screen and the display screen and to move relative to the touch screen and display screen in a normal direction of the contact boundary. The saw wire is reciprocated between the touch screen and the display screen so as to complete a preliminary separation between the display screen and the touch screen, and then the display screen and the touch screen are separated by the adsorption device, thus the display screen and touch screen are not likely to be damaged and can be separated from each other successfully.

15 Claims, 1 Drawing Sheet

(51) Int. Cl.
*G06F 3/00* (2006.01)
*G02F 1/13* (2006.01)
*G02F 1/1333* (2006.01)
*B26D 7/01* (2006.01)
*B26D 7/10* (2006.01)
*B26D 7/18* (2006.01)

(52) U.S. Cl.
CPC ............ *G02F 1/13338* (2013.01); *G06F 3/00* (2013.01); *B26D 7/018* (2013.01); *B26D 7/10* (2013.01); *B26D 7/1836* (2013.01)

(58) Field of Classification Search
CPC ............... Y10T 83/472; Y10T 83/4722; Y10T 83/4725; Y10T 83/9292; Y10T 56/11; Y10T 56/1153; Y10T 56/1168; Y10T 56/19; Y10T 56/1911; Y10T 56/1059; B26D 1/547; B26D 1/5475; B26D 3/28; B26D 3/282; B26D 7/018; B26D 7/10; B26D 7/1836; B26D 7/1863; G02F 1/1303; G02F 1/13338; G02F 3/00
See application file for complete search history.

(56) References Cited

U.S. PATENT DOCUMENTS

| | | | | |
|---|---|---|---|---|
| 4,536,145 A * | 8/1985 | Sawyer | .................... | B26D 3/28 425/289 |
| 5,213,022 A * | 5/1993 | Elgan | .................... | B23D 53/04 83/797 |
| 5,343,363 A * | 8/1994 | Greeson | ............... | H05K 13/021 174/259 |
| 6,176,966 B1 * | 1/2001 | Tsujimoto | ......... | H01L 21/67132 156/701 |
| 8,858,859 B2 * | 10/2014 | Song | ..................... | B82Y 10/00 156/707 |
| 2006/0254432 A1 * | 11/2006 | McLemore | ......... | A47J 37/1209 99/448 |
| 2007/0267006 A1 * | 11/2007 | Ogyu | ....................... | B28D 1/08 125/21 |
| 2009/0183615 A1 * | 7/2009 | Sampica | ................ | B26D 1/547 83/651.1 |
| 2010/0107834 A1 * | 5/2010 | Lai | ........................ | B23D 49/02 83/15 |
| 2010/0199818 A1 * | 8/2010 | Lee | ....................... | B26D 1/547 83/16 |

FOREIGN PATENT DOCUMENTS

| | | |
|---|---|---|
| CN | 203616557 U | 5/2014 |
| JP | H03126913 A | 5/1991 |
| TW | 201029817 A | 8/2010 |

OTHER PUBLICATIONS

Chinese Rejection Decision dated Mar. 16, 2016, for corresponding Chinese Patent Application No. 201310721938.8.
English translation of first Chinese Office Action dated Nov. 27, 2014 for corresponding Chinese Application No. 201310721938.8.
English translation of second Chinese Office Action dated Apr. 29, 2015 for corresponding Chinese Application No. 201310721938.8.
English translation of Box No. V of Written Opinion of the International Search Report dated Aug. 22, 2014.
International Search Report and Written Opinion in Chinese dated Aug. 1, 2014 for PCT/CN2014/078294.

* cited by examiner

APPARATUS AND METHOD FOR SEPARATING TOUCH SCREEN AND DISPLAY SCREEN

BACKGROUND OF THE INVENTION

Field of the Invention

Embodiments of the present invention generally relate to the field of display technologies, and particularly, to an apparatus and method for separating a touch screen and a display screen.

Description of the Related Art

In an existing touch screen, a sealant or and a surface glue is attached onto surfaces of a liquid crystal screen. In view of a certain defective rate present in attached touch panel (TP for short) products, it is required to disassembly the touch screen so that it is separated from a display screen, thereby enabling an effective reworking.

For a touch screen of a type attached at its periphery by a sealant, as shown in FIG. 1, generally, a baking gun is used to separate a touch screen 1 and a display screen 2, chemical property of liquid crystal at edges of the display screen 2 would be easily deteriorated due to a high temperature provided by the baking gun 3, and a uniform heating cannot be easily achieved, thus the touch screen 1 and/or the display screen 2 would be easily broken when a knife 4 is moving between the touch screen 1 and the display screen 2 to separate the touch screen 1 from the display screen 2. Such a separating method is substantially non-feasible for a touch screen attached by using the surface glue.

SUMMARY OF THE INVENTION

In order to overcome the above and other defects in prior arts, the present invention provides an apparatus and method for separating a touch screen and a display screen, so that the display screen and/or the touch screen is prevented from being damaged when separating the touch screen from the display screen.

According to embodiments of one aspect of the present invention, there is provided an apparatus for separating a touch screen and a display screen, comprising:

a working base station configured to hold the touch screen and the display screen jointed together by a sealant;

a heater mounted inside of the working base station and configured to heat and soften the sealant between the touch screen and the display screen;

a saw wire arranged to contact a contact boundary between the touch screen and the display screen and to reciprocate at least in a tangent direction of the contact boundary so as to preliminarily separate the touch screen and the display screen;

a first adsorption device configured to adsorb the display screen and remove the display screen from the touch screen; and a mutual moving mechanism configured to enable the saw wire to contact the contact boundary between the touch screen and the display screen and to move relative to the touch screen and display screen in a normal direction of the contact boundary.

In the above apparatus, the mutual moving mechanism may comprise: two slide rails provided on two opposite sides of the working base station respectively; and two winding posts mounted on the slide rails respectively and configured to slide along the slide rails relative to the working base station, two ends of the saw wire being secured to the winding posts respectively so that the saw wire is driven in the normal direction of the contact boundary between the touch screen and the display screen.

In the above apparatus, the winding posts may be rotatable clockwise or counterclockwise so as to drive the saw wire to move in the tangent direction of the contact boundary between the touch screen and the display screen.

The apparatus may further comprise a second adsorption device mounted onto the working base station and configured to adsorb the touch screen on the working base station.

In the above apparatus, a plurality of adsorption holes may be provided in an upper surface of the working base station, and the second adsorption device may be provided at a bottom of the working base station so as to adsorb the touch screen through the adsorption holes.

In the above apparatus, the first adsorption device may be mounted above the working base station.

In the above apparatus, the saw wire may be made of a metal wire or carbon fiber.

In the above apparatus, a housing of the heater may be provided with a preset temperature display window configured to display a preset heating temperature of the heater and an actual temperature display window configured to display an actual heating temperature of the heater.

In the above apparatus, the winding post may comprise:
a base slidably mounted on the slide rail; and
a rotary shaft rotatablely mounted on the base, the saw wire being wound around the rotary shaft.

According to embodiments of another aspect of the present invention, there is provided a method for separating a touch screen and a display screen, comprising steps of:

holding the touch screen provided with the display screen on a working base station;

turning on a heater located below the working base station to heat the touch screen provided with the display screen;

locating a saw wire between the display screen and the touch screen when a sealant between the display screen and the touch screen is heated to be softened, moving the saw wire from one end of the touch screen to the other end thereof through a mutual moving mechanism and moving the saw wire reversely, thereby completing a preliminary separation between the display screen and the touch screen; and after completing the preliminary separation between the display screen and the touch screen, adsorbing the display screen tightly through a first adsorption device so as to remove the display screen from the touch screen.

In the above method, the mutual moving mechanism may comprise:

two slide rails provided on two opposite sides of the working base station in a longitudinal direction thereof respectively; and two winding posts mounted on the slide rails respectively and configured to slide longitudinally along the slide rails, two ends of the saw wire being secured to the winding posts respectively, and the winding posts being rotatable clockwise or counterclockwise so as to drive the saw wire to move between the touch screen and the display screen in a lateral direction, the saw wire is drawn back and forth, like a saw, by the winding posts through clockwise or counterclockwise rotation of the winding posts, and is moved through a longitudinal sliding movement of the winding posts on the slide rails.

In the above method, the saw wire may be made of a metal wire or carbon fiber. The winding posts slide back and forth on the slide rails so as to drive the saw wire to split the display screen and the touch screen through many times of reciprocating movement. Further, when the actual heating temperature of the heater reaches the preset heating temperature, the display screen and the touch screen starts to be separated preliminarily.

In the apparatus and method for separating a touch screen and a display screen according to embodiments of the present invention, after the sealant between the touch screen and the display screen has heated to be softened by the heater, a saw wire is used to reciprocate between the touch screen and the display screen so as to complete a preliminary separation between the display screen and the touch screen, then the display screen and the touch screen are separated by the adsorption device. The apparatus has a simple structure and is easy to operate, so that the display screen and the touch screen are not likely to be damaged by the apparatus and can be separated from each other successfully.

DETAILED DESCRIPTION OF PREFERRED EMBODIMENTS OF THE INVENTION

Specific ways of implementing the present invention will be further described hereinafter in detail in conjunction with the attached drawings and embodiments. The following embodiments are intended to illustrate the present invention, but not to limit the scope of the present invention.

It is noted that, in the description of the present invention, orientation or positional relations indicated by terms such as "center", "upper", "lower", "horizontal", "bottom", "inside", "outside" or the like are based on those shown in the attached drawings, and they are only intended to facilitate and simplify the description of the present invention, rather than indicating or implying that a device or element indicated by the terms must have a particular orientation, or must be configured and operated at a particular orientation, thus, it should understood that these terms are not used to limit the present invention.

It is also noted that in the description of the present invention, unless expressly stated and defined otherwise, terms "mounting", "connection" should be interpreted broadly, for example, it may be a fixed connection, a detachable connection or an integral connection; it may be a mechanical connection or an electrical connection; it may be a direct connection, or a indirect connection via an intermediate medium, or it may be an internal communication between two elements. For those skilled in the art, specific meanings of the above terms in the present invention may be interpreted in accordance with specific conditions.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
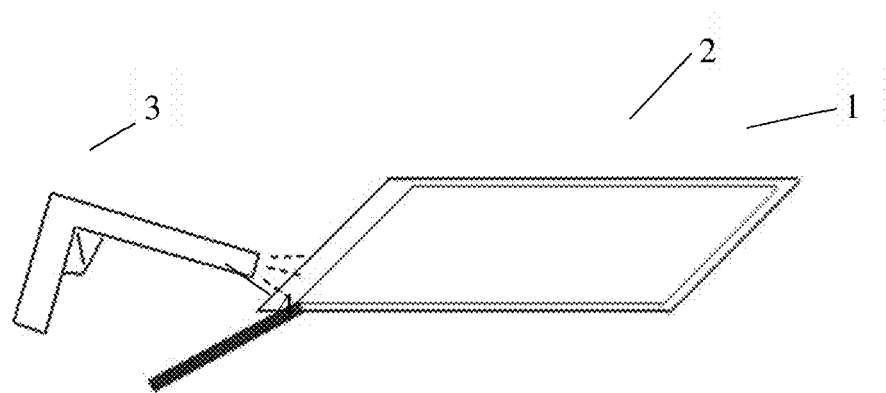
FIG. 1 is a schematic diagram showing the principle of separating a display screen and a touch screen in prior arts.
Figure 2:
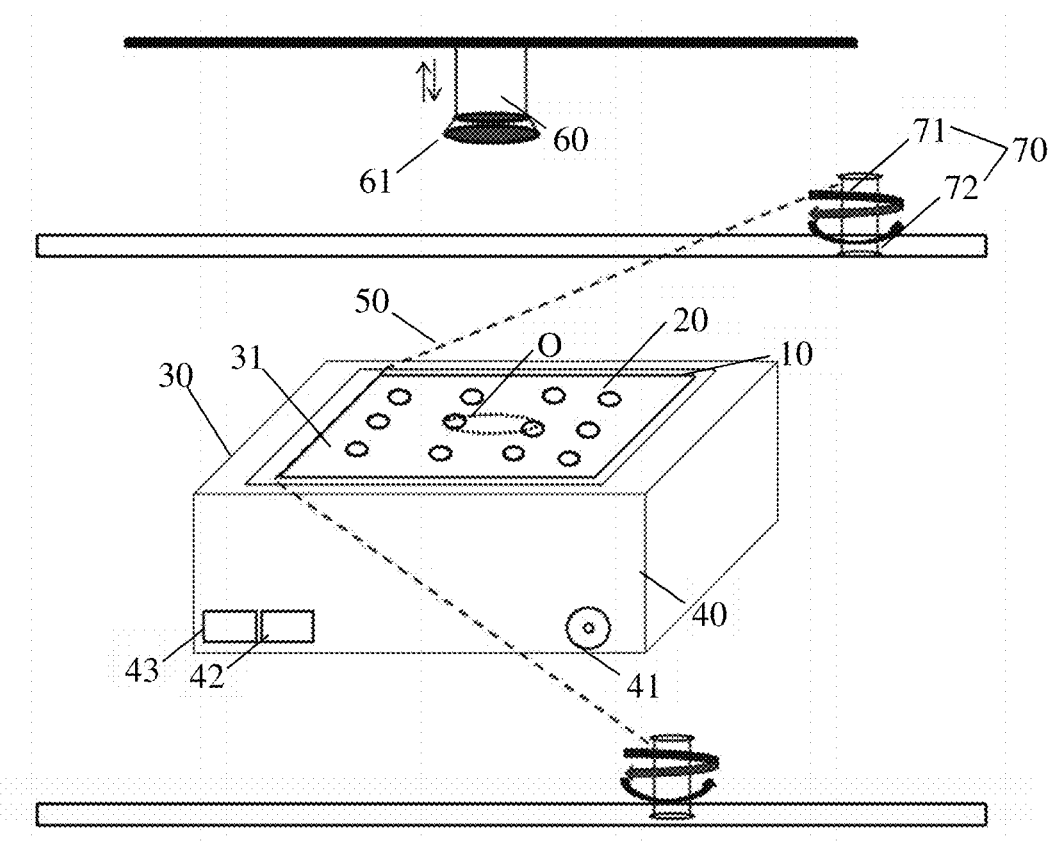
FIG. 2 is a structural schematic diagram showing an apparatus for separating a touch screen and a display screen according to one exemplary embodiment of the present invention.

FIG. 2 is a structural schematic diagram showing an apparatus for separating a touch screen and a display screen according to one exemplary embodiment of the present invention. As shown in FIG. 2, the apparatus for separating a touch screen and a display screen comprises a heater 40, a working base station 30, a first adsorption device 60, a saw wire 50 and a mutual moving mechanism 70. The working base station 30 is configured to hold a touch screen 10 and a display screen 20 jointed together by a sealant; the heater 40 is mounted inside of the working base station 30, and is configured to heat and soften the sealant between the touch screen 10 and the display screen 20; the saw wire 50 is arranged to contact a contact boundary between the touch screen 10 and the display screen 20 and reciprocate at least in a tangent direction (e.g., a lateral direction) of the contact boundary so as to preliminarily separate the touch screen 10 and the display screen 20; the first adsorption device 60 is configured to adsorb the display screen 20 and remove the display screen 20 from the touch screen 10; and the mutual moving mechanism 70 is configured to enable the saw wire 50 to contact the contact boundary between the touch screen 10 and the display screen 20 and to move relative to the touch screen 10 and display screen 20 in a normal direction of the contact boundary, and to implement a reciprocating movement. The display screen 20 is preferably a liquid crystal screen.

According to one exemplary embodiment of the present invention, a housing of the heater 40 is provided with a switch 41 for controlling on and off of the heater 40, a preset temperature display window 42 configured to display a preset heating temperature of the heater 40, and an actual temperature display window 43 configured to display an actual heating temperature of the heater 40. When the temperature displayed in the actual temperature display window 43 is the same as the preset temperature of the preset temperature display window 42, it shows that the sealant between the touch screen 10 and the display screen 20 has been heated and softened to a desired condition, then a separation operation between the touch screen 20 and the display screen 10 can be performed.

Further, the saw wire 50 should have certain strength and rigidity, for example, the saw wire may be made of a metal wire or carbon fiber. When the saw wire 50 is made of carbon fiber, carbon fiber having high strength should be selected, and the metal wire may be, for example, a molybdenum wire. The heater 40 comprises an electric heater.

In a further embodiment, the apparatus for separating a touch screen and a display screen further comprises a second adsorption device mounted on the working base station 30 and configured to adsorb the touch screen 10 onto the working base station 30. For example, the second adsorption device is provided at the bottom of the working base station 40 and located inside of the heater 40.

It can be understood by those skilled in the art that the device for holding the touch screen and the display screen is not limited to the second adsorption device. In an alternative embodiment, a recess may be formed in the working base station 40, the touch screen and the display screen may be placed within the recess and then may be held within the recess by an extendable and retractable structure provided on walls of the recess. In a further alternative embodiment, an elastic member, for example, an elastic cord fixed on the working base station, may be used to press two ends of the touch screen 10, so that the touch screen 10 is held on the working base station.

Mutual moving mechanisms 70 are provided on two opposite sides of the working base station 30 respectively, and two ends of the saw wire 50 are connected to the mutual moving mechanisms 70 respectively. The mutual moving mechanisms 70 can drive the saw wire 50 to move in a normal direction (e.g., a right and left direction shown in FIG. 2, that is, a longitudinal direction) of the contact boundary between the touch screen 10 and the display screen 20.

In one exemplary embodiment, the mutual moving mechanisms 70 comprise two winding posts 71 and two slide rails 72, wherein the two slide rails 72 are provided on the two opposite sides of the working base station 30 respectively and are parallel to a splitting direction of the touch screen 10 and the display screen 20; the two winding posts 72 are mounted on the respective slide rails 72 and can slide on the slide rails 72 relative to the working base station, the two ends of the saw wire 50 are fixed to the winding posts 71 so that the saw wire 50 is driven to move in the normal direction of the contact boundary between the touch screen 10 and the display screen 20.

In one exemplary embodiment, the working base station 30 is provided on an upper surface of the heater 40, adsorption holes are provided in an upper surface of the working base station 30, and the second adsorption device is provided at the bottom of the working base station. The first adsorption device 60 is mounted above the working base station 30, the slide rails 72 are respectively provided on two opposite sides of the working base station 30 in parallel with the longitudinal direction of the touch screen 10 and the display screen 20, and the two ends of the saw wire 50 are wound around respective winding posts 71 on two opposite sides of the working base station 40. For example, the winding posts 72 may be mounted on the slide rails 72 through pulleys.

The winding posts 71 may be rotated in a clockwise direction and in a counterclockwise direction in order to adjust the saw wire 50 to have a suitable length so as to ensure that a splitting force provided by the saw wire 50 is large enough when the touch screen 10 and the display screen 20 are split by the saw wire 50.

It is noted that structures of the winding posts 71 are not limited as above, and as a principle, the winding posts 71 are configured to be slidable and rotatable. In one exemplary embodiment, each winding post may comprise a base and a rotary shaft, the base may, for example, be mounted on the slide rail 72 via a pulley, the rotary shaft is rotatablely mounted on the base, and the saw wire is wound around the rotary shaft. A drive mechanism such as a motor may be mounted on the base to enable an automatic rotation of the winding post and/or an automatic sliding movement of the whole winding post.

Both the first adsorption device 60 and the second adsorption device are vacuum adsorption devices, wherein the use of vacuum adsorption may prevent the display screen 20 and the touch screen 10 from being damaged during the adsorption. The first adsorption device 60 is mounted on the working base station by means of a support frame and is moveable in an up and down direction. When performing the adsorption operation, a vacuum chuck 61 of the first adsorption device tightly adsorbs a center position O of the display screen 20.

According to embodiments of another aspect of the present invention, there is provided a separation method of using the apparatus for separating a touch screen and a display screen according to the above various embodiments. Specifically, the method comprises steps of:

1. holding the touch screen 10 provided with the display screen 20 on the working base station 30; for example, the touch screen 10 provided with the display screen 20 is adsorbed on the working base station 30 by the second adsorption device through adsorption holes 31 in the working base station 30; turning on the heater 40 positioned below the working base station 30 to heat the touch screen 10 provided with the display screen 20; a heating temperature is not higher than a phase transition temperature of liquid crystal molecules, and the heating temperature is generally 50~100°, preferably 80°, and a heating time is generally 3~20 minutes, preferably 5~15 minutes; since the display screen 20 is relatively lighter, preferably, the display screen 20 is located above the touch screen 10;

2. locating the saw wire 50 between the display screen 20 and the touch screen 10 to extend therebetween when an actual heating temperature of the heater 40 reaches a preset heating temperature and the sealant between the display screen and the touch screen is softened; adjusting a length of the saw wire 50 by rotating the winding posts 71 in a forward direction and a reverse direction, so that the winding posts 71 draw the saw wire back and forth, like a saw, and the saw wire is moved through a sliding movement of the winding posts 71 on the slide rails 72; moving the saw wire 50 from one end of the touch screen to the other end thereof, and then moving the saw wire 50 reversely, thereby the saw wire 50 is reciprocated many times to split the display screen 20 and the touch screen 10, finally completing a preliminary separation between the display screen 20 and the touch screen 10; the saw wire 50 is a metal wire or carbon fiber; and 3. after completing the preliminary separation between the display screen 20 and the touch screen 10, adsorbing the display screen 20 tightly with the vacuum chuck 61 of the first adsorption device 60 so that the display screen 20 is moved upwards, and thereby the display screen 20 is removed from the touch screen 10.

In the apparatus and method for separating a touch screen and a display screen according to embodiments of the present invention, the saw wire can be reciprocated in both the tangent direction and the normal direction of the contact boundary between the touch screen and the display screen. The heater is used to soften the sealant between the touch screen and the display screen, then the saw wire is reciprocated between the touch screen and the display screen so as to complete a preliminary separation between the display screen and the touch screen, and finally, the display screen and the touch screen are separated by the adsorption device. The apparatus has a simple structure and is easy to operate, so that the display screen and the touch screen are not likely to be damaged by the apparatus and can be separated from each other successfully. Further, the two ends of the saw wire can slide back and forth on slide rails through the winding posts so as to perform splitting operations for many times, so that convenience of operation is improved, and a splitting direction of the saw wire can be ensured to be parallel to the display screen and the touch screen. Further, the sliding movement of the winding posts, to which the two ends of the saw wire are fixed, on the slide rails can be controlled manually, or can be automatically controlled through connecting the winding posts to a controller, which can be designed according to practical requirements.

The above description is only made with respect to preferred embodiments of the present invention, it should be noted that, for those skilled in the art, several improvements and alternatives may be made without departing from the principle of the disclosure, and these improvements and alternatives should be regarded as falling within the scope of the present invention.

What is claimed is:

1. An apparatus for separating a touch screen and a display screen, comprising:
    a working base station configured to hold the touch screen and the display screen jointed together by a sealant;
    a holding mechanism configured to hold the touch screen and the display screen on the working base station;
    a heater mounted inside of the working base station and configured to heat and soften the sealant between the touch screen and the display screen;
    a saw wire arranged to contact a contact boundary between the touch screen and the display screen and to reciprocate at least in a first direction tangent to the contact boundary so as to preliminarily separate the touch screen and the display screen;
    a single first adsorption device configured to contact and adsorb a center position of the display screen which has been preliminarily separated from the touch screen and remove the display screen from the touch screen; and
    a mutual moving mechanism configured to enable the saw wire to contact the contact boundary between the touch screen and the display screen and to drive the saw wire to move relative to the touch screen and display screen in a-second direction normal to the contact boundary, the mutual moving mechanism being further configured to drive the saw wire to reciprocate in the first direction,
    wherein the mutual moving mechanism comprises: two slide rails provided on two opposite sides of the working base station respectively; and two winding posts mounted on the slide rails respectively and configured to slide along the slide rails relative to the working base station, two ends of the saw wire being secured to the winding posts respectively so that the saw wire is driven to the second direction between the touch screen and the display screen, and
    wherein the winding post comprises: a base slidably mounted on the slide rail; and a rotary shaft rotatably mounted on the base, the saw wire being wound around the rotary shaft.

2. The apparatus according to claim 1, wherein the winding posts are rotatable clockwise or counterclockwise so as to drive the saw wire to move in the first direction between the touch screen and the display screen.

3. The apparatus according to claim 2, further comprising a second adsorption device mounted to the working base station and configured to adsorb the touch screen onto the working base station.

4. The apparatus according to claim 2, wherein the first adsorption device is mounted above the working base station.

5. The apparatus according to claim 2, wherein a housing of the heater is provided with a preset temperature display window configured to display a preset heating temperature of the heater and an actual temperature display window configured to display an actual heating temperature of the heater.

6. The apparatus according to claim 1, further comprising a second adsorption device mounted to the working base station and configured to adsorb the touch screen onto the working base station.

7. The apparatus according to claim 6, wherein a plurality of adsorption holes are provided in an upper surface of the working base station, and the second adsorption device is provided at a bottom of the working base station so as to adsorb the touch screen through the adsorption holes.

8. The apparatus according to claim 6, wherein the first adsorption device is mounted above the working base station.

9. The apparatus according to claim 6, wherein a housing of the heater is provided with a preset temperature display window configured to display a preset heating temperature of the heater and an actual temperature display window configured to display an actual heating temperature of the heater.

10. The apparatus according to claim 1, wherein the first adsorption device is mounted above the working base station.

11. The apparatus according claim 1, wherein the saw wire is made of a metal wire or carbon fiber.

12. The apparatus according to claim 1, wherein a housing of the heater is provided with a preset temperature display window configured to display a preset heating temperature of the heater and an actual temperature display window configured to display an actual heating temperature of the heater.

13. A method for separating a touch screen and a display screen, comprising steps of:
    holding the touch screen provided with the display screen on a working base station by a holding mechanism;
    turning on a heater located below the working base station to heat the touch screen provided with the display screen;
    locating a saw wire between the display screen and the touch screen when a sealant between the display screen and the touch screen is heated to be softened, moving the saw wire from one end of the touch screen to the other end thereof in a direction normal to a contact boundary between the touch screen and the display screen through a mutual moving mechanism and moving the saw wire reversely through the mutual moving mechanism, and meanwhile driving the saw wire to reciprocate in a direction tangent to the contact boundary by the mutual moving mechanism, thereby completing a preliminary separation between the display screen and the touch screen; and
    after completing the preliminary separation between the display screen and the touch screen, adsorbing a center position the display screen tightly through a single first adsorption device so as to remove the display screen from the touch screen,
    wherein the mutual moving mechanism comprises: two slide rails provided on two opposite sides of the working base station in a longitudinal direction thereof respectively; and two winding posts mounted on the slide rails respectively and configured to slide longitudinally along the slide rails, two ends of the saw wire being secured to the winding posts respectively, and the winding posts being rotatable clockwise or counterclockwise so as to drive the saw wire to move between the touch screen and the display screen in a lateral direction, and
    wherein the winding post comprises: a base slidably mounted on the slide rail; and a rotary shaft rotatably mounted on the base, the saw wire being wound around the rotary shaft.

14. The method according to claim 13, wherein
    the saw wire is drawn back and forth, like a saw, by the winding posts through clockwise or counterclockwise rotation of the winding posts, and is moved through a longitudinal sliding movement of the winding posts on the slide rails.

15. The method according to claim 13, wherein the saw wire is made of a metal wire or carbon fiber.

* * * * *

UNITED STATES PATENT AND TRADEMARK OFFICE
CERTIFICATE OF CORRECTION

| | |
|---|---|
| PATENT NO. | : 10,328,591 B2 |
| APPLICATION NO. | : 14/426466 |
| DATED | : June 25, 2019 |
| INVENTOR(S) | : Wenming Wu, Fangfang Wu and Lin Lin |

It is certified that error appears in the above-identified patent and that said Letters Patent is hereby corrected as shown below:

In the Claims

Column 8, Line 40:
Delete "meanwhile driving"
Insert --driving--

Signed and Sealed this
Twenty-seventh Day of August, 2019

Andrei Iancu
*Director of the United States Patent and Trademark Office*